Figure 1:
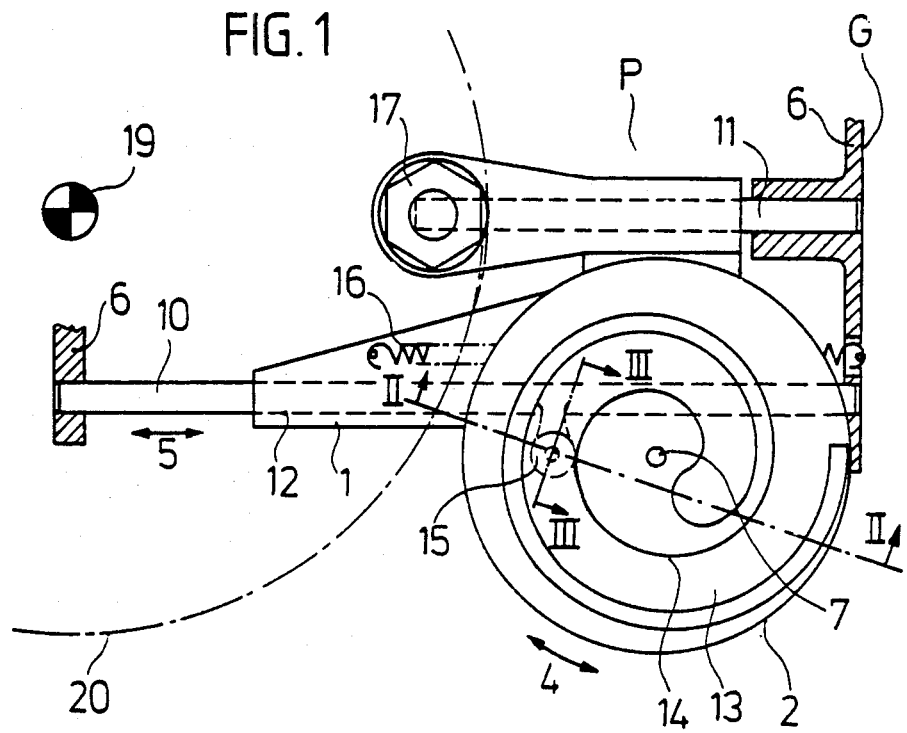

United States Patent [19]

Hack et al.

[11] Patent Number: 4,626,944
[45] Date of Patent: Dec. 2, 1986

[54] POSITIONING DEVICE FOR SCANNING MEANS IN A DISK DRIVE UNIT

[75] Inventors: Joachim Hack, Ludwigshafen; Klaus Schulze-Berge, Mutterstadt; Klaus Birkenmeier, Appenweier, all of Fed. Rep. of Germany

[73] Assignee: BASF Aktiengesellschaft, Ludwigshafen, Fed. Rep. of Germany

[21] Appl. No.: 503,291

[22] Filed: Jun. 10, 1983

[30] Foreign Application Priority Data

Jun. 14, 1982 [DE] Fed. Rep. of Germany ... 8216961[U]

[51] Int. Cl.[4] .............................................. G11B 21/08
[52] U.S. Cl. .................................................... 360/106
[58] Field of Search ...................... 360/106, 104–105, 360/109, 78, 75; 308/1 R; 74/206

[56] References Cited

U.S. PATENT DOCUMENTS

| | | | |
|---|---|---|---|
| 4,012,778 | 3/1977 | Johnson | 360/106 |
| 4,198,666 | 4/1980 | Manzke et al. | 360/106 |
| 4,468,712 | 8/1984 | Mueller et al. | 360/78 |

Primary Examiner—John H. Wolff
Assistant Examiner—David J. Severin
Attorney, Agent, or Firm—Keil & Weinkauf

[57] ABSTRACT

A positioning device, comprising a cylindrical guide element and a guide surface, is so designed that an angle of less than 90°, especially of from 1° to 80°, is formed between an axis at right angles to the direction of movement of the guide element over the guide surface and the axis of rotation of the guide element, in the plane containing these two axes. The peripheral surface of the guide element can be grooved or convex. The novel positioning device can be used with advantage in any type of recording/playback apparatus for disk records.

10 Claims, 4 Drawing Figures

POSITIONING DEVICE FOR SCANNING MEANS IN A DISK DRIVE UNIT

The present invention relates to a positioning device for at least one scanning means in a disk drive unit, in which the support for the scanning means is associated with a substantially cylindrical guide element mounted for rotation about one axis, the said guide element cooperating with at least one guide surface and travelling approximately horizontally along and in contact with said surface, as well as to a drive unit for disk records, especially floppy disks, which drive unit includes a positioning device according to the invention.

A drive unit for floppy disks (e.g. FlexyDisk—Registered Trademark of BASF Aktiengesellschaft, 6700 Ludwigshafen, Germany), in which head positioning is effected by a wheel running in the spiral groove of a guide disk is known from U.S. Pat. No. 4,198,666. In this unit, the guide surface is vertical.

We have found that particles of dust, abraded material and dirt on the guide wheel or on the guide surface lead to substantial positioning errors, for example track jumping during writing and reading.

It is an object of the present invention to provide an improved positioning device which eliminates the said errors, and hence an improved drive unit for disk records, especially floppy disks.

We have found that this object is achieved with a positioning device in wnich an angle of less than 90° is formed between an axis at right angles to the direction of movement of the guide element and the axis of rotation of the guide element, in the plane containing these two axes.

By arranging the guide element at an angle to its direction of movement in this manner, a cleaning action between the guide element and the guide surface is achieved, the width and location of the cleaned area depending on the effective width of the peripheral surface of the guide element and the angle of inclination of the guide element.

This cleaning action is surprisingly effective and highly useful in precision guide means such as are used in all types of signal recording/reproducing apparatus.

The particles of dirt, dust and abraded material are removed from the area of contact between the guide element and the guide surface and are pushed to the side, where they can no longer cause trouble.

A drive unit for disk records, especially floppy disks for recording and/or reproducing digital or analog signals, is advantageously obtained if it is provided with a novel positioning device for one or more read/write heads where the guide element is arranged at an angle of less than 90°, and in particular at an angle of from 1° to 80°, to the direction of motion.

In practice, the angle of inclination is advantageously from about 1° to about 10°. The peripheral surface of the guide element is advantageously grooved. In a particular embodiment, the grooves are arranged at an angle to the axis of rotation of the guide element, especially at an angle of 45° thereto, whereby the cleaning action is intensified in a simple manner, without special matching of the materials of construction being necessary.

In a further advantageous embodiment, the peripheral surface of the guide element is convex.

Figure 2:
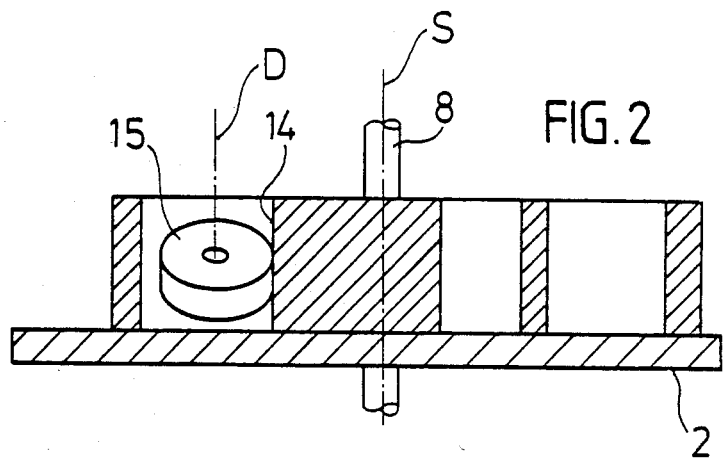
Figure 3:
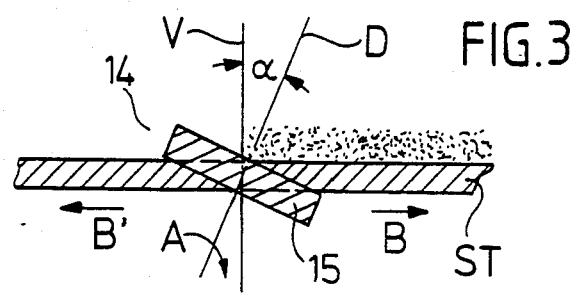
Figure 4:
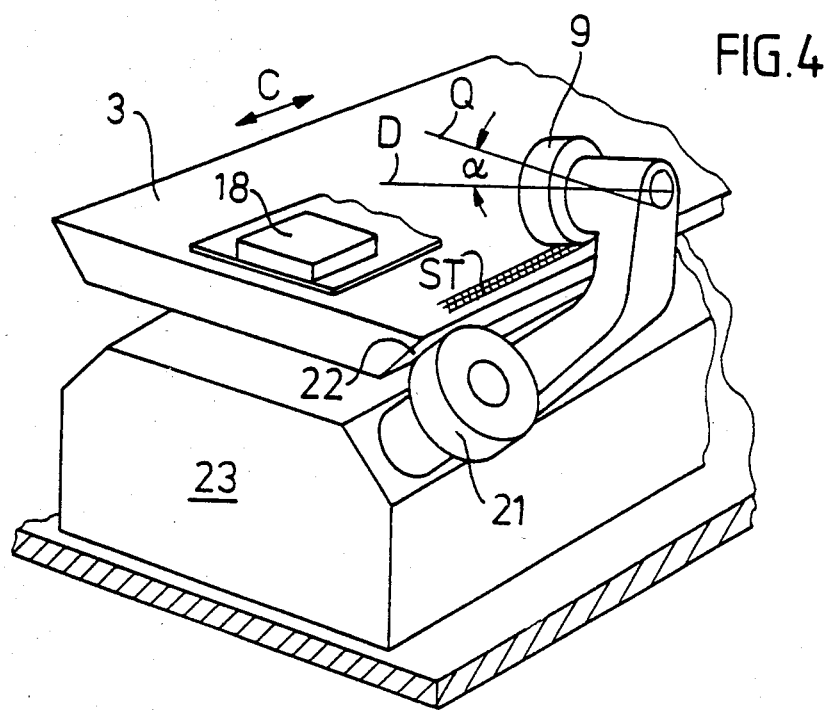

Further details of the invention are disclosed below with reference to the embodiments given by way of example and illustrated in the accompanying drawings, in which FIG. 1 is a schematic plan view of a magnetic disk drive unit with a positioning device according to the invention comprising a rotatable disk with a spiral groove, and a guide roller cooperating with said groove, FIG. 2 is a cross-sectional view of the rotatable disk shown in FIG. 1, taken along the line II—II thereof, showing the inclined guide roller, FIG. 3 is a cross-sectional view of the guide roller, taken along the line III—III of FIG. 1, and FIG. 4 is a schematic perspective view of part of the carriage for a different type of disk drive unit, again with inclined guide rollers.

The head positioning device P comprises the following principal components: a carriage 1, which at the same time serves as the support for the magnetic head 17, a spirally grooved disk 2 and a stepping motor, not shown in the drawing, which can be located above or below the spirally grooved disk 2.

The stepping motor, spirally grooved disk 2 and carriage 1 are conveniently combined in a sub-unit, and are advantageously arranged one above the other.

A frame 6 of the housing G or the disk drive unit is shown in cross-section. The spirally grooved disk 2 has a central hole 7, through which the shaft 8 of the stepping motor protrudes. The motor shaft 8 and spirally grooved disk 2 are rigidly connected together.

The carriage 1 is slidably mounted on, for example, hardened steel shafts 10 and 11, so that it can move longitudinally in the directions indicated by double arrow 5. The shafts 10 and 11 are fixed in the frame 6 of the housing, as shown in FIG. 1. The shaft 10 together with the bore 12 in the carriage 1, the shaft fitting in the bore with virtually no play, constitutes the actual carriage guide, whereas the second shaft 11 prevents the carriage 1 and hence the magnetic head 17 from rotating.

The disk 2 has a spiral groove 13 which is made by suitable machining, for example milling. The spiral groove 13 is advantageously of substantially constant pitch. In cross-section, the groove 13 shown in FIG. 1 is of rectangular shape and is hence easily produced. The groove 13 has a wall 14 parallel to the axis of rotation of the disk 2. In a simple practical embodiment, a commercial ball bearing 15 is attached to the carriage 1 in an appropriate position with respect to the groove 13. On rotation of the spirally grooved disk 2, the ball bearing 15 travels along the spiral groove, so that, depending on the direction of rotation (double arrow 4) of the disk 2, the carriage 1 is shifted longitudinally in one of the directions indicated by double arrow 5, i.e. forward or backward. The carriage 1 is drawn toward the frame 6 by means of the tension spring 16 attached thereto. As a result, the ball bearing 15 or, more precisely, the outer race thereof, bears against the wall 14 of the groove 13 and is thus essentially in rolling frictional contact with wall 14.

Due to the direct contact between the wall 14 and the ball bearing 15, the carriage can be guided virtually without any backlash in both directions of rotation 4 of the disk 2. Advantageously, the pitch of the spiral groove 13 is such that, for every step of the stepping motor, the carriage 1 is advanced by an amount corresponding to the track spacing. By means of the control current supplied to the stepping motor, the carriage 1 and hence the magnetic head 17 are held in position when the desired position on the disk record 20 has been reached, against the bias of the spring 16. While the disk 20, in particular a floppy disk, rotates on the drive shaft 19, any desired track on the disk 20 can be reached for writing or reading data by displacing the carriage 1 and hence the head 17. The guide disk 2 is shown in plan view. As can be seen, the spiral groove extends over an angle of more than 360° and is preferably of such a length that the carriage 1 and hence the magnetic head 17 can move, in either of the directions indicated by double arrow 5, over their entire range of travel which corresponds to the sum of the track spacings and the number of tracks.

FIG. 2 is a cross-sectional view of the guide disk 2 and clearly shows that the axis of rotation D of the ball bearing 15 is not arranged parallel to the axis of rotation S of the disk 2, but at angle α thereto, the angle α being formed between the axis V which is at right angles to the direction of movement B, B' of the guide element 15 (relative to the guide wall 14) and the axis of rotation D of the guide element 15.

Owing to the fact that the guide roller 15 is arranged at an angle to the wall 14, i.e. is at an angle to the direction of movement, a sliding motion is superimposed on the rolling motion of the roller 15, as a result of which a strip on the wall 14 beneath the roller 15, the width of which strip depends on the size of the angle α and the effective width of the peripheral surface, is cleared of particles of dirt and other matter. The strip ST in FIG. 3 is cleaned in the direction of movement B and direction of rotation A of the roller 15 and the particles are pushed upward, as shown in the drawing, i.e. are removed from the track of the roller 15. If the direction of movement in FIG. 3 is reversed, the particles are pushed to the other side, namely downward. In the embodiment described above, the surface of wall 14 is curved, but of course the invention is also applicable if the guide surface is plane, as shown in FIG. 4.

Referring to FIG. 4, a carriage 3 for at least one magnetic head 18 is slidably mounted on a bearing support 23 via an anti-friction bearing 9 which cooperates with a guide surface on the upper face of the carriage 3, and an antifriction bearing 21 which cooperates with an inclined guide surface 22. Of course, a pair of anti-friction bearings 9, 21 is also arranged symmetrically on the other side of the carriage 3 but, for simplicity's sake, has been omitted.

The two antifriction bearings 9 and 21 illustrated in FIG. 4 are at an angle to axis Q which is at right angles to the direction of movement C of the carriage 3, the axis Q lying in a horizontal plane. The axis of rotation is again marked D, and the angle of inclination is again marked α. A cleaned strip ST is also shown.

The angle α should be smaller than 90° and is generally from about 1° to about 80°. It is advantageously from about 1° to 40° and preferably from about 1° to 10°.

A soiling experiment with dirt particles applied to the wall 14 has shown that the maximum positioning error of 70 μm after 100 positioning cycles, measured directly after soiling, can be reduced by the positioning device according to the invention to values of from 0 to 10 μm. In another experiment using a guide element 15 which was not inclined, the positioning error after 100 positioning cycles was not reduced.

To intensify the cleaning action, the peripheral surface of the guide roller 15 is advantageously profiled. For example, we have found it advantageous to provide the guide roller with a plurality of grooves which run round its peripheral surface.

It is more advantageous to arrange the grooves at an angle, preferably of 45°, to the axis of rotation D. An additional cleaning effect may also be achieved by appropriate matching of the materials of construction.

It may also be advantageous for the peripheral surface of the guide element to be convex.

The positioning device of the present invention can be used with advantage in any type of recording/reproducing apparatus where, for head positioning purposes, a guide roller runs along a guide surface.

We claim:

1. A positioning device for at least one scanning means in a disk drive unit, said positioning device comprising a support mounting said at least one scanning means, and two cooperating guide means for imparting a longitudinal movement to said support, said guide means including a guide surface and a cooperating rotatable guide element in contact with said guide surface, one of said guide means being part of said support, and said guide element being, axially nondisplaceably, mounted for rotation about an axis disposed at an acute angle (α) to an axis which is perpendicular to the direction of movement of said support, both said axes, and hence said angle therebetween, lying in a plane which bisects said guide element and is parallel to the tangential plane as between said guide surface and said guide element, and the angular mounting of said rotatable guide element resulting in an automatic cleaning action between the guide element and the guide surface.

2. A device as claimed in claim 1, wherein the angle (α) is from 1° to about 80°.

3. A device as claimed in claim 1, wherein the angle (α) is from about 1° to about 10°.

4. A device as claimed in claim 1, wherein the peripheral surface of the guide element is convex.

5. A positioning device as claimed in claim 1, wherein said guide surface is a cam surface on a control disk, and said rotatable element is angularly mounted on said support such that said support is advanced and retracted under the control of the control disk, with an automatic cleaning action between said guide element and said cam surface.

6. A positioning device as claimed in claim 1, wherein said guide surface is a guide surface extending rectilinearly on said support and said rotatable guide element is a relatively stationary element engaging said guide surface for guiding said support for rectilinear movement, the angular mounting of said guide element resulting in an automatic cleaning action between said guide element and said guide surface.

7. A device as claimed in claim 1, wherein the peripheral surface of the guide element is grooved.

8. A device as claimed in claim 7, wherein the grooves are at an angle, in particular of 45°, to the axis of rotation of the guide element.

9. A drive unit for disk records, expecially floppy disks, having a positioning device for at least one write/read head, said positioning device comprising a support mounting said at least one head, and two cooperating guide means for imparting a longitudinal movement to said support, said guide means including a guide surface and a cooperating rotatable guide element in contact with said guide surface, one of said guide means being part of said support, and said guide element being, axially non-displaceably, mounted for rotation about an axis disposed at an angle (α) of from 1° to 80° to an axis which is perpendicular to the direction of movement of said support, both said axes, and hence said angle therebetween, lying in a plane which bisects said guide element and is parallel to the tangential plane as between said guide surface and said guide element, and the angular mounting of said rotatable guide element resulting in an automatic cleaning action between the guide element and the guide surface.

10. A drive unit as claimed in claim 9, wherein a plurality of grooves, arranged at an angle of 45° to the axis of rotation of the guide element, are provided in the peripheral surface of the guide element.

* * * * *